United States Patent
Wan

(10) Patent No.: US 11,156,795 B2
(45) Date of Patent: Oct. 26, 2021

(54) LENS MODULE

(71) Applicant: AAC Technologies Pte. Ltd., Singapore (SG)

(72) Inventor: Jia Wan, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 134 days.

(21) Appl. No.: 16/525,584

(22) Filed: Jul. 30, 2019

(65) Prior Publication Data

US 2020/0041747 A1 Feb. 6, 2020

(30) Foreign Application Priority Data

Aug. 3, 2018 (CN) .......................... 201821245248.4

(51) Int. Cl.
*G02B 7/02* (2021.01)
*G02B 13/00* (2006.01)

(52) U.S. Cl.
CPC ........... *G02B 7/021* (2013.01); *G02B 13/003* (2013.01); *G02B 13/0035* (2013.01)

(58) Field of Classification Search
CPC .. G02B 7/021; G02B 13/0035; G02B 13/003; G02B 7/022; G02B 13/00; G02B 7/02
See application file for complete search history.

(56) References Cited

U.S. PATENT DOCUMENTS

2006/0018036 A1\* 1/2006 Huang ................... G02B 7/022
  359/694
2006/0140623 A1\* 6/2006 Yu .......................... G03B 17/02
  396/529
2009/0015945 A1\* 1/2009 Chen ...................... G02B 7/021
  359/819
2009/0174954 A1\* 7/2009 Hara ....................... G02B 7/021
  359/819
2013/0027788 A1\* 1/2013 Yen ..................... G02B 13/0045
  359/763

(Continued)

FOREIGN PATENT DOCUMENTS

JP  2011039446 A1  2/2011
JP  2015106131 A1  6/2015

OTHER PUBLICATIONS

Examiner provided machine translation of Mizutsuki et al.. (JP2011039446A, of record) (Year: 2011).\*

(Continued)

*Primary Examiner* — Balram T Parbadia
(74) *Attorney, Agent, or Firm* — W&G Law Group

(57) ABSTRACT

A lens module, including: a lens barrel having a receiving space, a set of lenses received in the receiving space, the set of lenses including at least a first lens and a second lens close to the first lens, and a positioning structure fixing the first lens to the second lens. The first lens includes a first optical portion for imaging and a first fixing portion surrounding the first optical portion, and the second lens includes a second optical portion for imaging and a second fixing portion surrounding the second optical portion. The positioning structure includes a positioning part arranged on one of the first fixing portion and the second fixing portion, and a holding part arranged on the other one of the first fixing portion and the second fixing portion. The holding part holds the positioning part.

1 Claim, 2 Drawing Sheets

(56) References Cited

U.S. PATENT DOCUMENTS

| | | | |
|---|---|---|---|
| 2013/0050850 A1* | 2/2013 | Lin | G02B 7/021 359/738 |
| 2013/0176625 A1* | 7/2013 | Chen | G02B 3/0075 359/619 |
| 2014/0029114 A1* | 1/2014 | Kim | G02B 7/021 359/709 |
| 2014/0104691 A1* | 4/2014 | Chang | G02B 13/0035 359/611 |
| 2016/0085046 A1* | 3/2016 | Kim | G02B 7/026 359/830 |
| 2018/0348466 A1* | 12/2018 | Hirth | G02B 21/02 |

OTHER PUBLICATIONS

1st Office Action dated Jul. 20, 2020 by JPO in related Japanese Patent Application No. 2019-131091 (4 Pages).

* cited by examiner

LENS MODULE

TECHNICAL FIELD

The present disclosure relate to the field of optical imaging technologies, and in particular, to a lens module.

BACKGROUND

With development of technologies, electronic devices are becoming more and more intelligent. In addition to digital cameras, portable electronic devices such as tablets and cellphones are also equipped with a lens module having a camera function to meet the user's requirements of taking pictures at any moment. However, as the technology progresses, the user's requirements on imaging quality of the lens module are becoming higher and higher. In the prior art, the lens module usually includes a set of lenses and a lens barrel. The set of lenses is arranged in the lens barrel and constituted by at least two lenses, in which the lenses are fixed to one another.

The inventors of the present disclosure found that stability and reliability of fixation between the lenses directly affects the imaging quality of the entire lens module. However, for the lens module in the prior art, a lens is generally fixed to the adjacent lenses by mutual pressing, which may easily lead to relative displacement between the lenses, thereby resulting in poor stability and reliability of fixation between the lenses.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
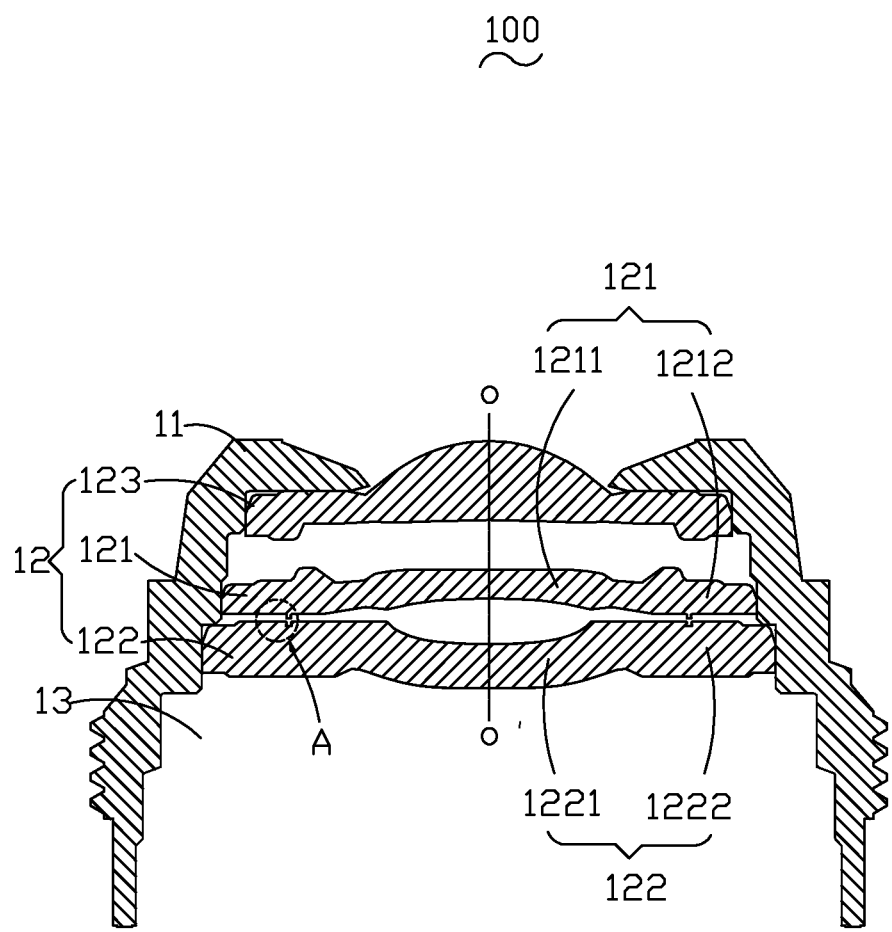
FIG. 1 is a structural schematic cross-sectional view of a lens module according to a first embodiment of the present disclosure.
Figure 2:
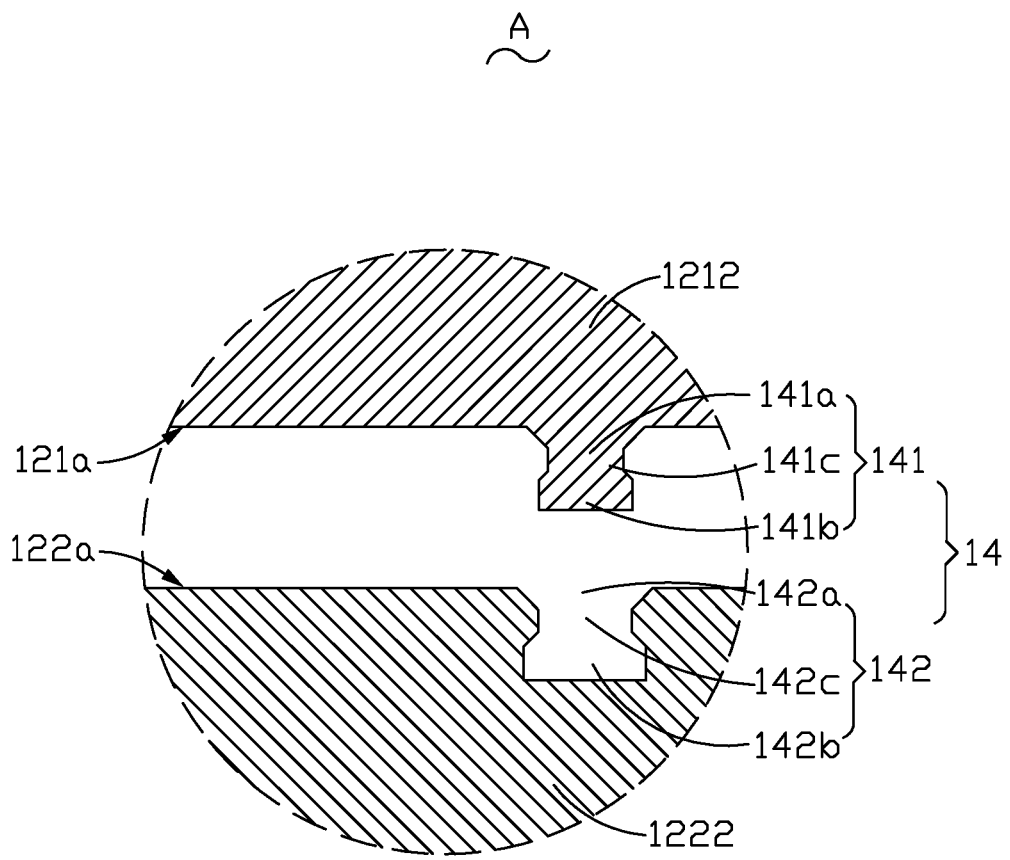
FIG. 2 is an enlarged view of area A in FIG. 1.

A first embodiment of the present disclosure provides a lens module 100. As shown in FIG. 1 and FIG. 2, the lens module 100 includes a lens barrel 11 and a set of lenses 12. The lens barrel 11 has a receiving space 13 in which the set of lenses 12 are received. The set of lenses 12 includes at least a first lens 121 and a second lens 122 close to the first lens 121. It should be understood that lens set 12 may also include other lenses, such as a lens 123. The first lens 121 includes a first optical portion 1211 for imaging, and a first fixing portion 1212 surrounding the first optical portion 1211. The second lens 122 includes a second optical portion 1221 for imaging, and a second fixing portion 1222 surrounding the second optical portion 1221. The lens module 100 further includes a positioning structure 14. The positioning structure 14 includes a positioning part 141, and a holding part 142 holding the positioning part 141. The positioning part 141 is arranged on one of the first fixing portion 1212 and the second fixing portion 1222, and the holding part 142 is arranged on the other one of the first fixing portion 1212 and the second fixing portion 1222.

Compared with the prior art, in the first embodiment of the present disclosure, the lens module 100 is provided with the positioning structure 14, and the positioning part 141 is held by the holding part 142. Since the positioning part 141 and the holding part 142 are respectively arranged on the first lens 121 and the second lens 122, the first lens 121 is fixed to the second lens 122 while the holding part 142 holding the positioning part 141. Due to a holding effect of the holding part 142 to the positioning part 141, stability and reliability of fixation between the first lens 121 and the second lens 122 are improved.

Specifically, in this embodiment, the first fixing portion 1212 includes an image-side surface 121a close to an image side, and the second fixing portion 1222 includes an object-side surface 122a disposed opposite to the image-side surface 121a. The positioning part 141 is arranged on one of the image-side surface 121a and the object-side surface 122a, and the holding part 142 is arranged on the other one of the image-side surface 121a and the object-side surface 122a.

Further, in this embodiment, the positioning part 141 is a protrusion, and the holding part 142 is a groove engaged with the protrusion. The so-called engagement herein means that the protrusion and the groove have complementary shapes and complementary sizes, and the protrusion can be embedded and stably snapped into the groove, so that the holding part 142 and the positioning part 141 are relatively fixed. A simple structure with the protrusion and the groove enables the holding part 142 to hold the positioning part 141, and thus the structure thereof is relatively simple and convenient to manufacture.

Further, in this embodiment, the positioning part 141 (i.e., the protrusion) is arranged on the first fixing portion 1212. The positioning part 141 includes a connecting portion 141a connected to the first fixing portion 1212, a clamping portion 141b located at a side of the connecting portion 141a facing away from the first fixing portion 1212, and a middle portion 141c connecting the clamping portion 141b to the connecting portion 141a. A width of the clamping portion 141b in a direction perpendicular to an optical axis OO' of the lens module 100 is greater than a width of the middle portion 141c in the direction perpendicular to the optical axis OO' of the lens module 100.

In addition, in this embodiment, the positioning part 141 is arranged on the first fixing portion 1212, and the holding part 142 is arranged in the second fixing portion 1222. The holding part 142 (i.e., the groove) includes a groove opening portion 142a close to a surface of the second fixing portion 1222, a bottom portion 142b disposed at a side of the surface portion 142a facing away from the surface of the second fixing portion 1222, and a middle portion 142c connecting the groove opening portion 142a to the bottom portion 142b. The clamping portion 141b is received in the bottom portion 142b, the connecting portion 141a is received in the groove opening portion 142a, and the middle portion 141c is received in the middle portion 142c. Each of the bottom portion 142b and the clamping portion 141b has a width in the direction perpendicular to the optical axis OO' greater than the middle portion 142c in the direction perpendicular to the optical axis OO'. In this embodiment, the clamping portion 141b is received in the bottom portion 142b, the middle portion 141c is received in the middle portion 142c, and each of the bottom portion 142b and the clamping portion 141b has a width greater than the middle portion 142c, so that the holding part 142 can hold the positioning part 141 also in a direction of the optical axis OO', thereby preventing relative movement between the first lens 121 and the second lens 122 in the direction along the optical axis OO'. In this way, stability and reliability of the fixation between the first lens 121 and the second lens 122 can be further improved.

It should be understood that in this embodiment, it is only an exemplary position arrangement of the positioning part 141 and the holding part 142, that is, the positioning part 141 is arranged on the first fixing portion 1212 and the holding part 142 is arranged in the second fixing portion 1222. In other embodiments of the present disclosure, it is also possible that the holding part 142 is arranged on the first fixing portion 1212 and the positioning part 141 is arranged on the second fixing portion 1222, and a same technical effect can still be achieved without changing the specific structure of the holding part 142 and the positioning part 141. In actual production process, the position arrangement of the positioning part 141 and the holding part 142 can be selected according to actual needs.

It should be noted that in actual production process, there is no absolute parallel or perpendicular structure due to existence of errors. Therefore, the parallel or perpendicular structure defined herein in the embodiments may also be a substantial parallel or perpendicular structure that can achieve the technical effect of the present disclosure.

It should be understood by those skilled in the art that the above embodiments are merely some specific embodiments of the present disclosure, and various changes in form and details may be made without departing from the scope of the present disclosure.

What is claimed is:

1. A lens module, comprising:
a lens barrel having a receiving space,
a set of lenses received in the receiving space, the set of lenses comprising at least a first lens and a second lens close to the first lens, and
a positioning structure fixing the first lens to the second lens, wherein the first lens comprises a first optical portion for imaging and a first fixing portion surrounding the first optical portion, and the second lens comprises a second optical portion for imaging and a second fixing portion surrounding the second optical portion, the positioning structure comprises a protrusion arranged on the first fixing portion, and a groove arranged on second fixing portion;

the first fixing portion comprises an image-side surface close to an image side, and the second fixing portion comprises an object-side surface disposed opposite to the image-side surface, the protrusion is arranged on the image-side surface, and the groove is arranged on the object-side surface and fixed to and engaged with the protrusion;

the protrusion comprises a connecting portion connected to the first fixing portion, a clamping portion located at a side of the connecting portion facing away from the first fixing portion, and a middle portion connecting the connecting portion to the clamping portion; in a direction perpendicular to an optical axis of the lens module, the clamping portion has a greater width than the middle portion of the protrusion;

the groove comprises a groove opening portion close to a surface of the second fixing portion, a groove bottom portion located at a side of the groove opening portion facing away from the surface of the second fixing portion, and a groove middle portion connecting the groove opening portion to the groove bottom portion; the clamping portion is received in the groove bottom portion, the connecting portion is received in the groove opening portion, and the middle portion of the protrusion is received in the groove middle portion; in the direction perpendicular to the optical axis of the lens module, each of the groove bottom portion and the clamping portion has a width greater than the groove middle portion.

\* \* \* \* \*